(12) United States Patent
Neubrand

(10) Patent No.: US 7,429,070 B2
(45) Date of Patent: Sep. 30, 2008

(54) TONNEAU COVER FOR A VEHICLE WITH A CARGO AREA

(76) Inventor: Frank Neubrand, 5563 Edinborough, West Bloomfield, MI (US) 48322

( * ) Notice: Subject to any disclaimer, the term of this patent is extended or adjusted under 35 U.S.C. 154(b) by 195 days.

(21) Appl. No.: 11/216,256

(22) Filed: Aug. 31, 2005

(65) Prior Publication Data

US 2006/0043756 A1    Mar. 2, 2006

Related U.S. Application Data

(60) Provisional application No. 60/606,478, filed on Sep. 1, 2004, provisional application No. 60/606,032, filed on Aug. 31, 2004.

(51) Int. Cl.
*B60P 7/02* (2006.01)
(52) U.S. Cl. .................................. 296/100.09
(58) Field of Classification Search ............ 296/100.09, 296/100.06, 100.02, 100.01
See application file for complete search history.

(56) References Cited

U.S. PATENT DOCUMENTS

| | | | |
|---|---|---|---|
| 2,711,343 A | 6/1955 | Falk et al. | |
| 3,158,397 A | 11/1964 | Peras | |
| 3,675,967 A | 7/1972 | Ahrens | |
| 3,823,977 A | 7/1974 | Fioravanti | |
| 4,184,709 A | 1/1980 | Kim | |
| 4,277,098 A * | 7/1981 | Gibney | 296/100.09 |
| 4,620,743 A | 11/1986 | Eke | |
| 4,717,196 A * | 1/1988 | Adams | 296/98 |
| 4,799,726 A * | 1/1989 | Scott | 296/100.09 |
| 4,932,717 A * | 6/1990 | Swann | 296/100.09 |
| 5,203,364 A | 4/1993 | Koole | |
| 5,364,154 A | 11/1994 | Kaiser | |
| 6,234,563 B1 | 5/2001 | Bascou | |
| 6,336,674 B1 | 1/2002 | Gerisch et al. | |
| 6,505,878 B1 | 1/2003 | Mascolo | |
| 6,641,201 B1 | 11/2003 | Pietryga et al. | |
| 6,712,418 B1 | 3/2004 | Lathers | |

* cited by examiner

*Primary Examiner*—H Gutman
(74) *Attorney, Agent, or Firm*—Gifford, Krass, Sprinkle, Anderson & Citkowski, P.C.

(57) ABSTRACT

A tonneau cover system for selectively covering a cargo area of a vehicle, wherein the vehicle includes a roof adjacent the cargo area. The system includes a front panel, a rear panel, and an articulation mechanism. The articulation mechanism is operable to move the panels between an extended position, in which the panels are generally co-planar to cover the storage area, and a storage position, in which the panels are stacked on the roof of the vehicle to allow access to the storage area.

27 Claims, 21 Drawing Sheets

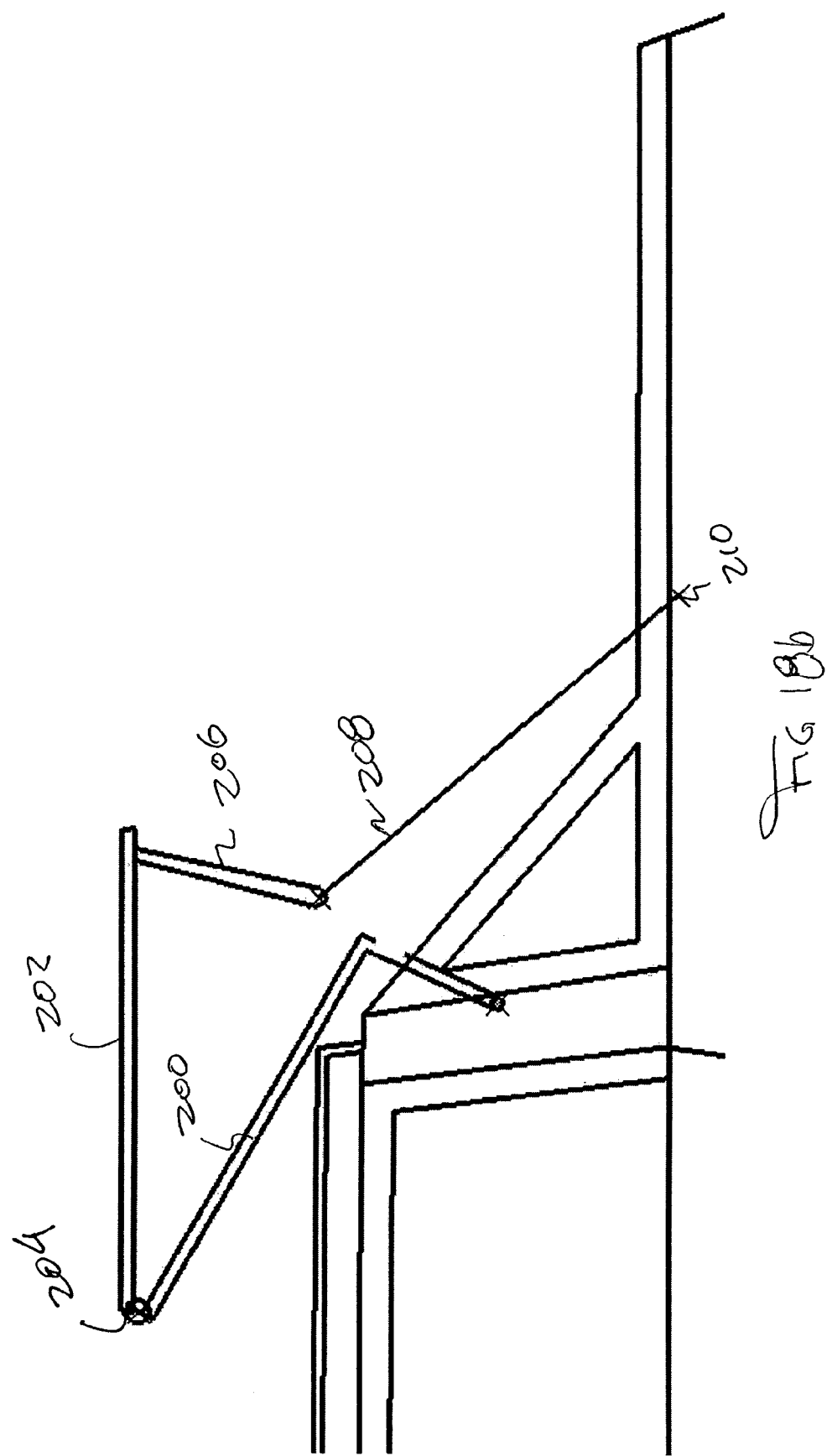

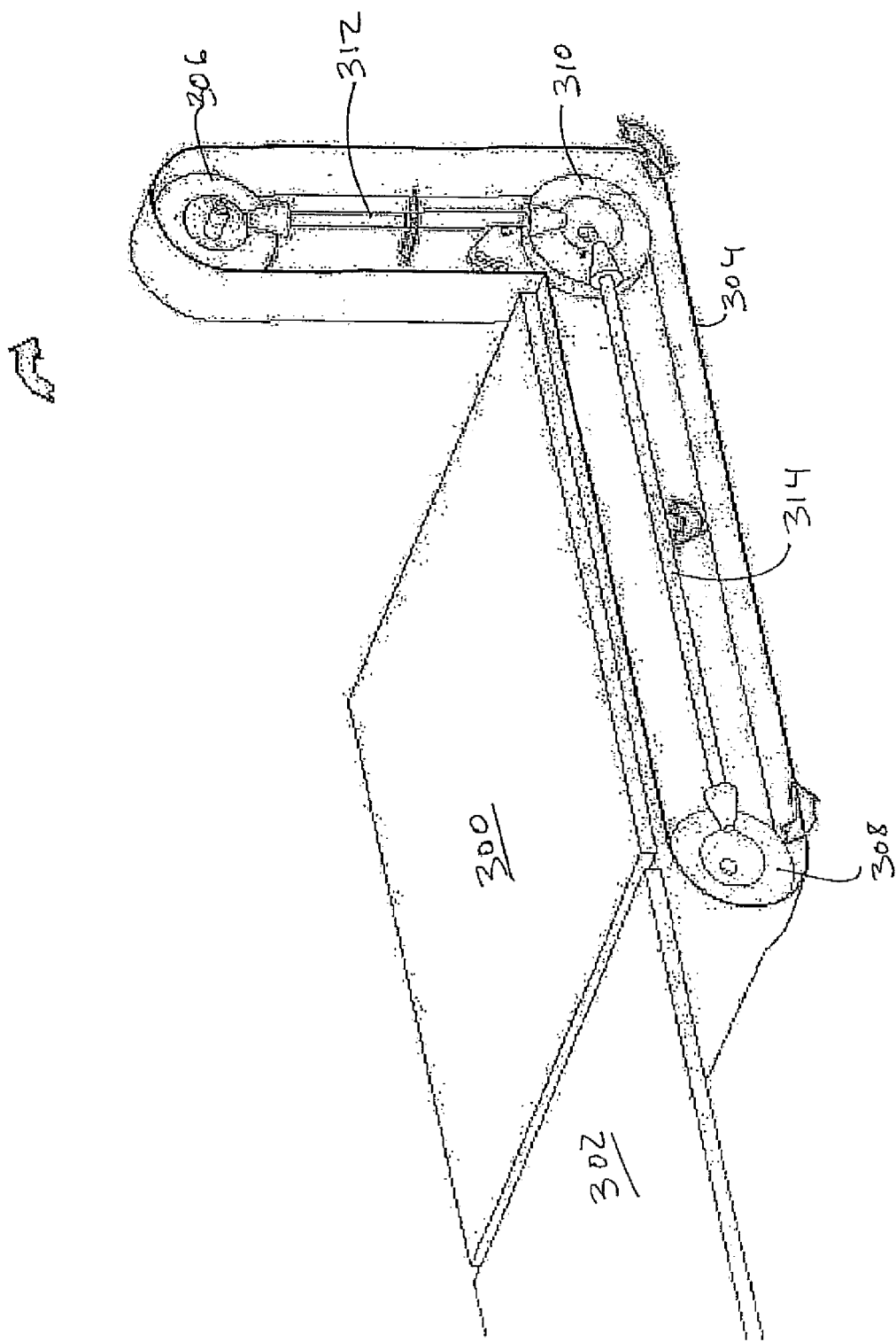

TONNEAU COVER FOR A VEHICLE WITH A CARGO AREA

CROSS REFERENCE TO RELATED APPLICATIONS

This application claims priority from U.S. Provisional Patent Application Ser. Nos. 60/606,032 filed on Aug. 31, 2004 and 60/606,478 filed on Sep. 1, 2004, the contents of which are incorporated herein by reference in its entirety.

BACKGROUND OF THE INVENTION

1. Field of the Invention

The invention relates to a tonneau cover for a vehicle having a cargo area. More particularly, the invention relates to a tonneau cover movable between an extended position for covering the cargo area and a storage position allowing access to the cargo area.

2. Description of the Related Art

Some SUVs include an open cargo carrying area similar to the bed of a pick-up truck, though usually much smaller. This allows a user of the vehicle to carry large and/or dirty objects in the bed. Often, it is desirable to cover the beds so as to have a closed and protected storage area. Covers for traditional pick-up truck beds and cargo areas of SUV's take a variety of forms. One of the simplest designs is a flexible vinyl or fabric material that attaches to the perimeter of the bed, and which can be detached and rolled up when not in use. Such a cover has the disadvantage that it provides little security. Hard tonneau covers are also provided. These sometimes take the form of a single rigid cover that is pivotally attached to the bed at its forward end and may be pivoted upwardly so as to provide access to the bed. Such a cover provides an improved aesthetic appearance and enhanced security, but is difficult and cumbersome to remove. If a user wishes to carry an object taller than the bed of the truck or SUV, the hard cover must be removed and stowed. This may require leaving the cover behind during vehicle usage. Hard tonneau covers are also provided in two or more rigid sections that may be folded so as to reduce their coverage areas. They may also be removed to provide an uncovered storage area. This improves the functionality of the cover, but still requires stowage of the removed cover when not in use which may require leaving the cover behind when the vehicle is in use.

In light of the above, there is a need for a tonneau cover that is rigid or has rigid sections and may be easily moved to an out of the way position so that the bed or storage area may be used in a completely open configuration. Further, there is a need for storing the cover on or in the vehicle while the cover is not in use covering the storage area or bed.

SUMMARY OF THE INVENTION

According to one aspect of the invention, a tonneau cover system is provided for selectively covering a cargo area of a vehicle, wherein the vehicle includes a roof adjacent the cargo area. The system includes a front panel, a rear panel, and an articulation mechanism. The articulation mechanism is operable to move the panels between an extended position, in which the panels are generally co-planar to cover the storage area, and a storage position, in which the panels are stacked on the roof of the vehicle to allow access to the storage area.

According to another aspect of the invention, a tonneau cover system is provided for selectively covering a cargo area of a vehicle, wherein the vehicle includes a roof adjacent the cargo area. The system includes at least one panel and an articulation mechanism. The at least one panel has an extended position wherein the panel covers at least a portion of the cargo area and a storage position wherein the panel is disposed on the roof of the vehicle. The panel has an outer surface that faces upwardly in the extended position and faces downwardly in the storage position. The articulation mechanism is operable to move the at least one panel between the extended position and the storage position.

According to another aspect of the invention, a tonneau cover system is provided for selectively covering a cargo area of a vehicle, wherein the vehicle has a roof adjacent the cargo area. The system includes at least one panel and an articulation mechanism. The at least one panel has an extended position wherein the panel covers at least a portion of the cargo area and a storage position wherein the panel is disposed on the roof of the vehicle. The articulation mechanism is operable to move the panel between the extended position and the storage position. The mechanism is configured such that the panel remains in a generally horizontal position throughout the movement between the extended position and the storage position.

According to another aspect of the invention, a tonneau cover system is provided for selectively covering a cargo area of a vehicle, wherein the vehicle has a roof adjacent the cargo area. The system includes at least one panel and an articulation mechanism. The at least one panel has an extended position wherein the panel covers at least a portion of the cargo area and a storage position wherein the panel is disposed on the roof of the vehicle. The articulation mechanism is operable to move the panel between the extended position and the storage position. The articulation mechanism includes a serpentine drive.

BRIEF DESCRIPTION OF THE DRAWINGS

Advantages of the present invention will be readily appreciated as the same becomes better understood by reference to the following detailed description when considered in connection with the accompanying drawings, wherein:

FIG. 18 is a side elevational view of the tonneau cover system of FIG. 17 shown in an intermediate position;

FIG. 20 is a perspective view of a fifth embodiment of the tonneau cover system shown in the extended position.

DETAILED DESCRIPTION OF THE PREFERRED EMBODIMENTS

Figure 1:
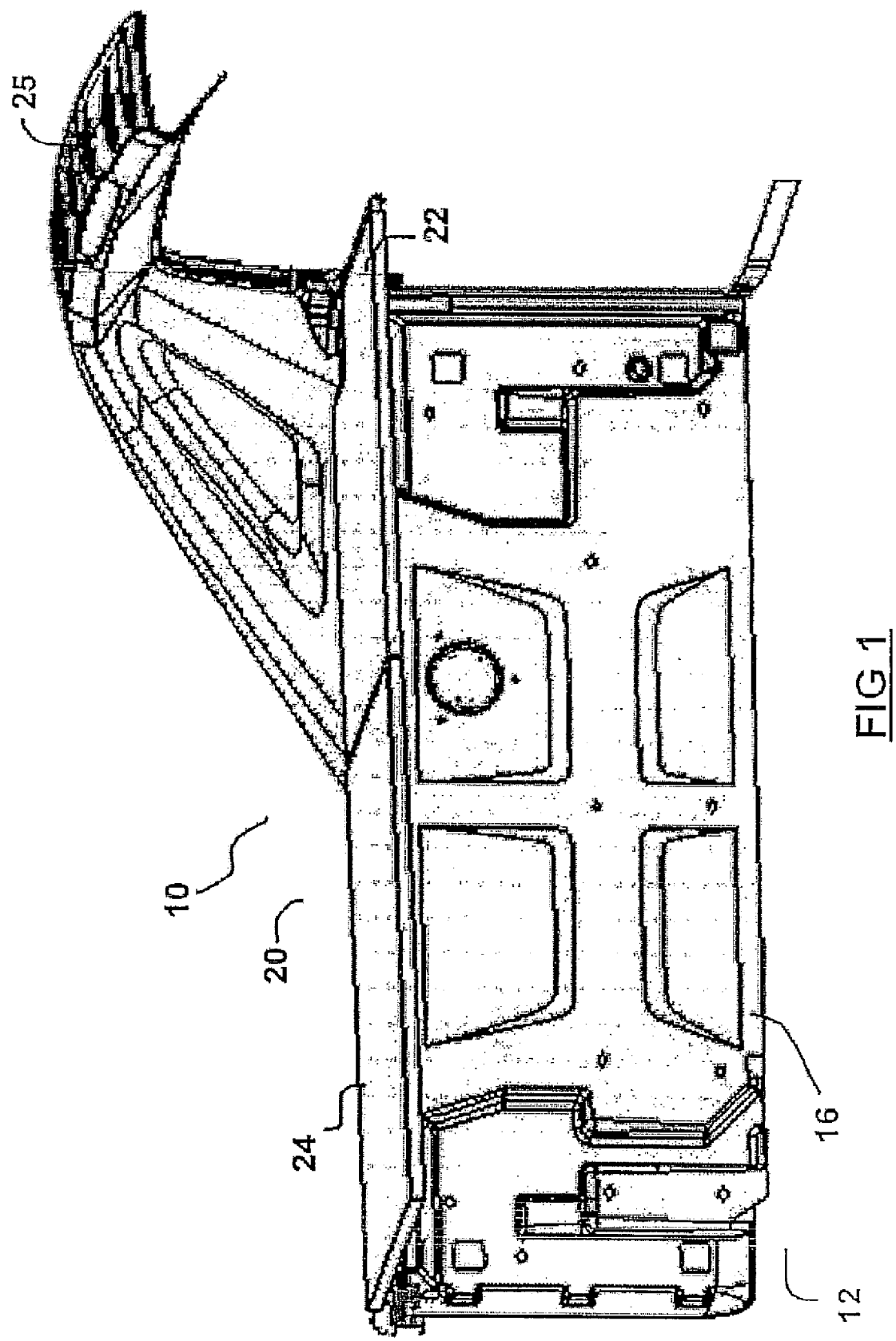
FIG. 1 is a perspective view of a vehicle and a tonneau cover system according to one embodiment of the invention, shown in an extended position.
Figure 2:
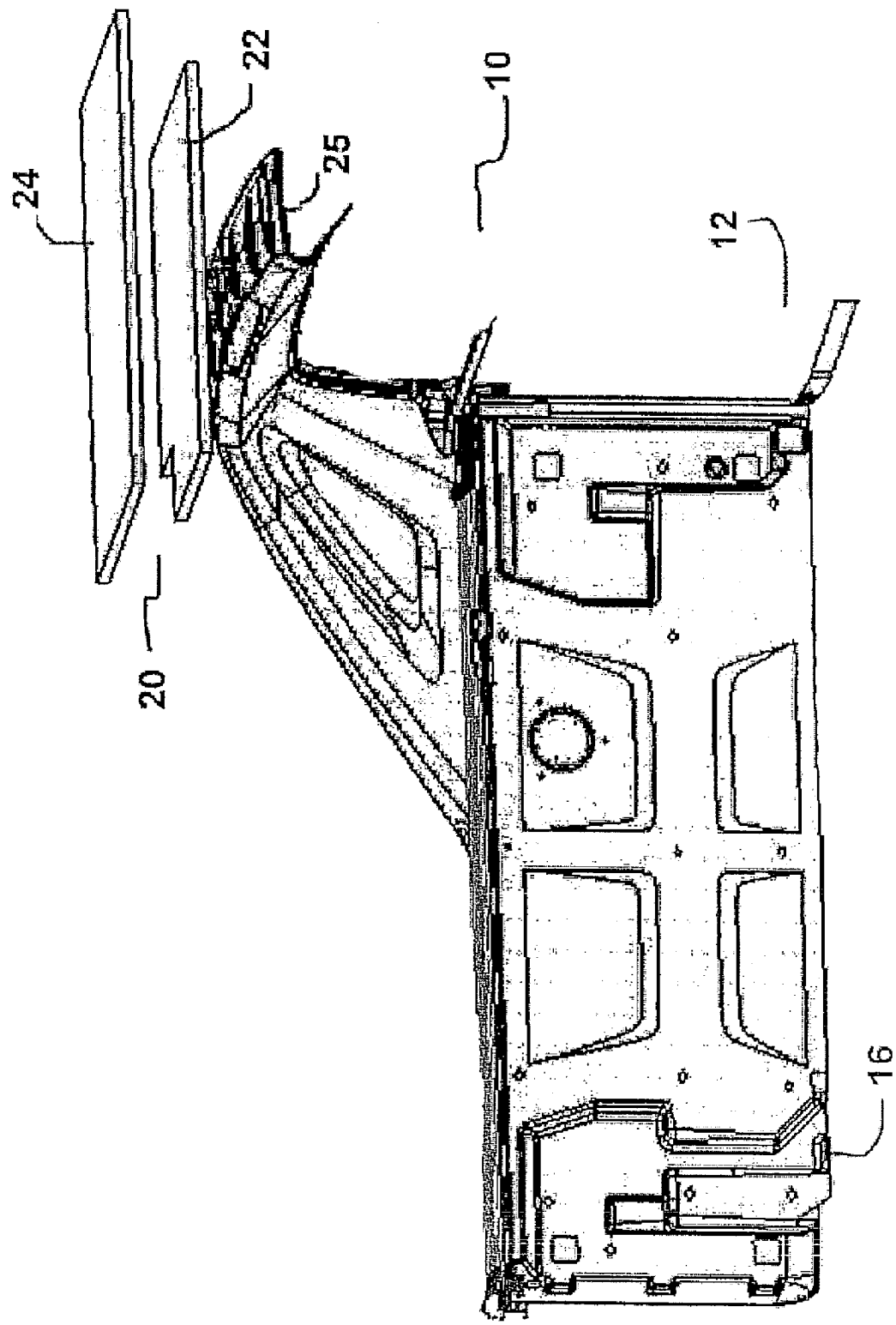
FIG. 2 is a perspective view of the vehicle with the tonneau cover system of FIG. 1 shown in a stored position.
Figure 3:
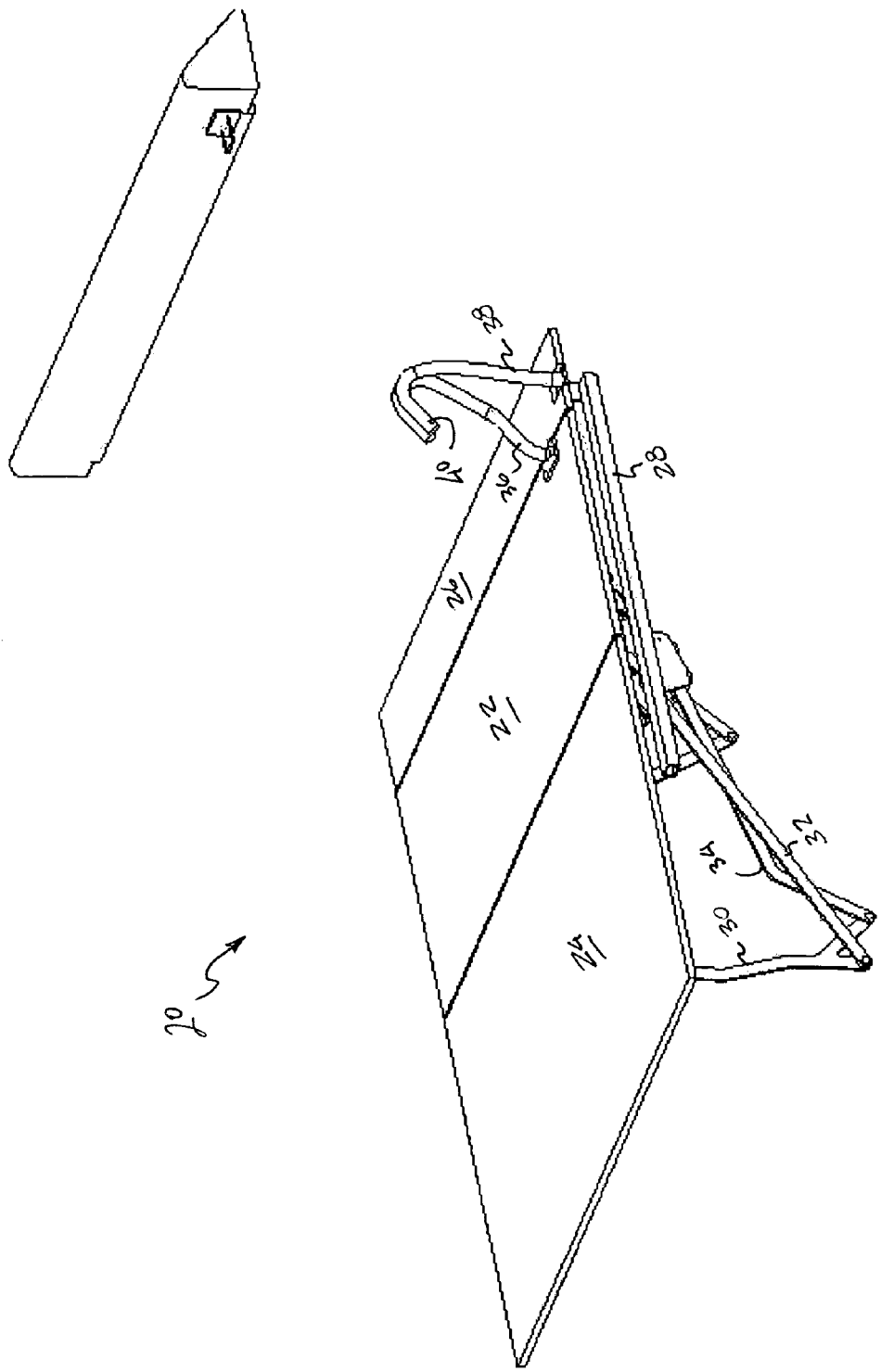
FIG. 3 is a perspective view of only the tonneau cover system according to a first embodiment of the invention, shown in the extended position.

Referring to FIGS. 1 and 2, a pickup truck is generally indicated at 10. The truck includes a rear bed or storage area 12. The storage area 12 has a generally horizontal floor and perimeter walls 16 extending upwardly from the floor to upper edges. A tonneau cover system according to one embodiment of the present invention is generally shown at 20. This system includes a front panel 22 and a rear panel 24. The system 20 may also include a trim panel 26, as shown in FIG. 3. In this embodiment, the trim panel 26 remains in the illustrated position and does not move with the front panel 22 and rear panel 24. In other embodiments, the trim panel 26 is connected to or integrated with front panel 22. In other embodiments, the trim panel 26 is omitted where it is not necessary for a given application. As described in greater detail below, the system 20 further includes an articulating mechanism or linkage that allows the front panel 22 and rear panel 24 to articulate between an extended position and a storage position, as shown in FIGS. 1 and 2, respectively. In the extended position, the panels 22, 24 cooperate to cover the storage area 12. In the storage position, the panels 22, 24 are stacked on a roof 25 of the truck 10 to allow access to the storage area 12. As will be clear to those of skill in the art, the tonneau cover system 20 may be adapted to use on pickups with other configurations. The present invention may also be used with SUVs and other vehicles with a storage area having an open top. The system will, however, be discussed below in terms of a pickup truck 10. Various embodiments of the system are also discussed below, each having a different articulation mechanism for moving the panels between the extended and stored positions.

Figure 4:
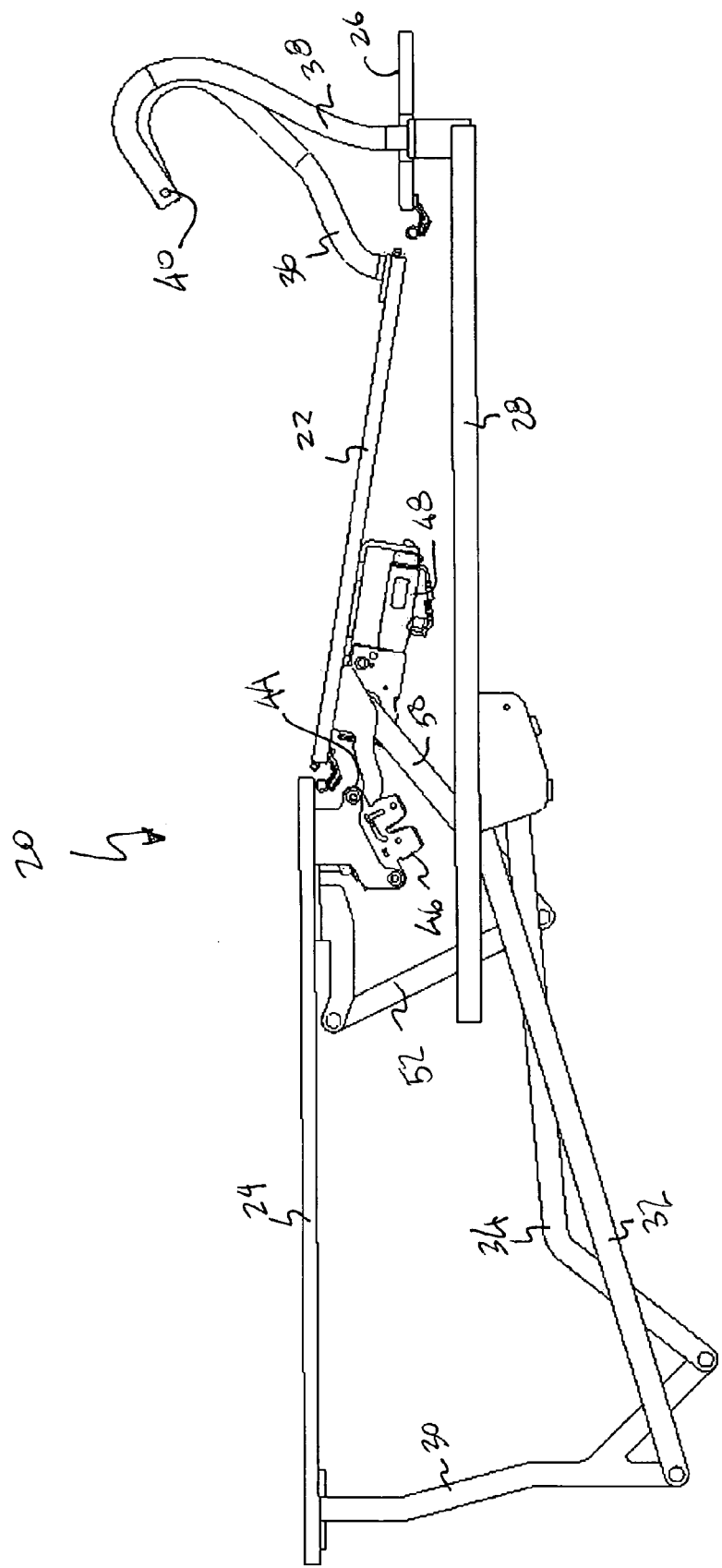
FIGS. 4-6 are views illustrating the tonneau cover system of FIG. 3 in various intermediate positions.
Figure 5:
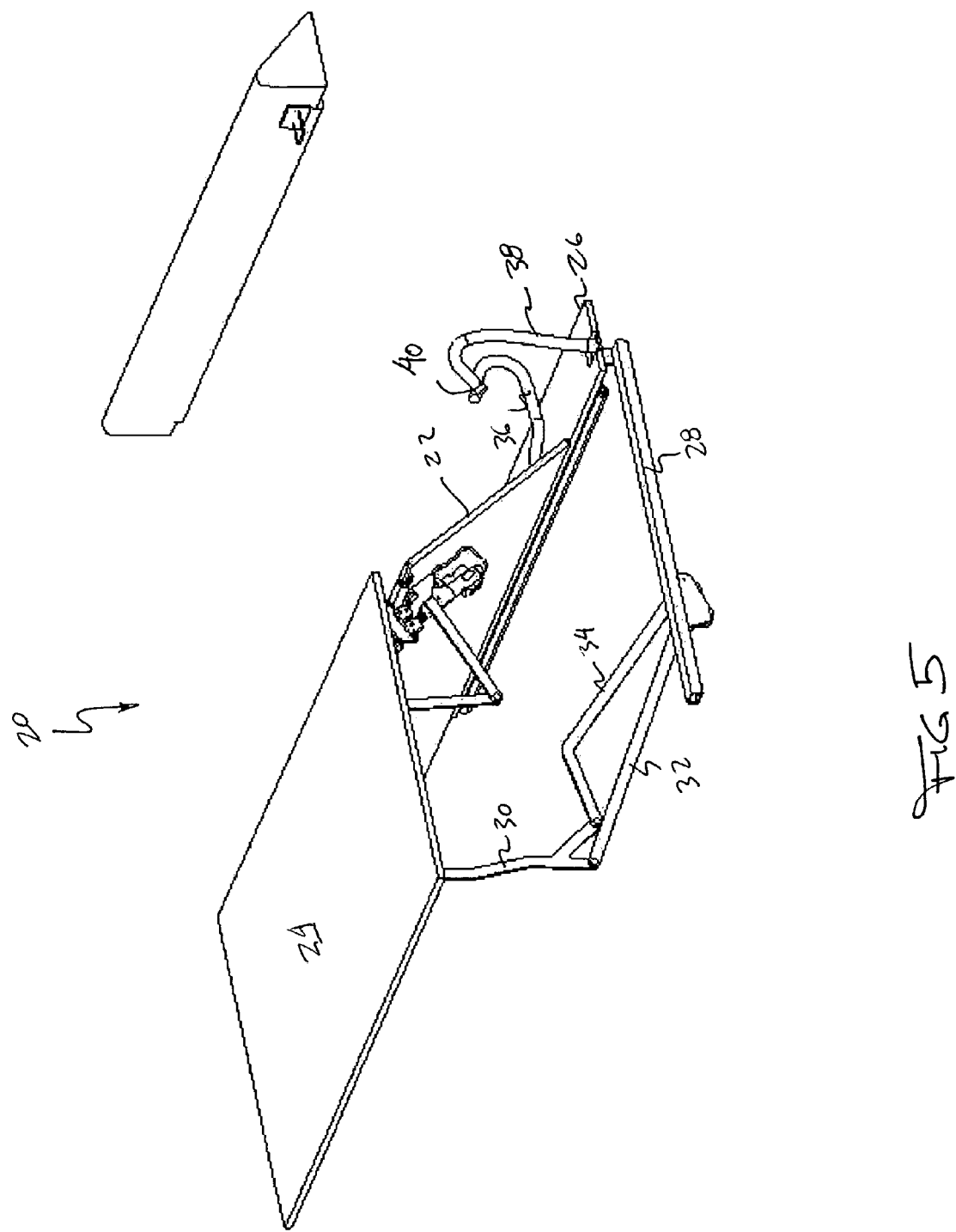
Figure 6:
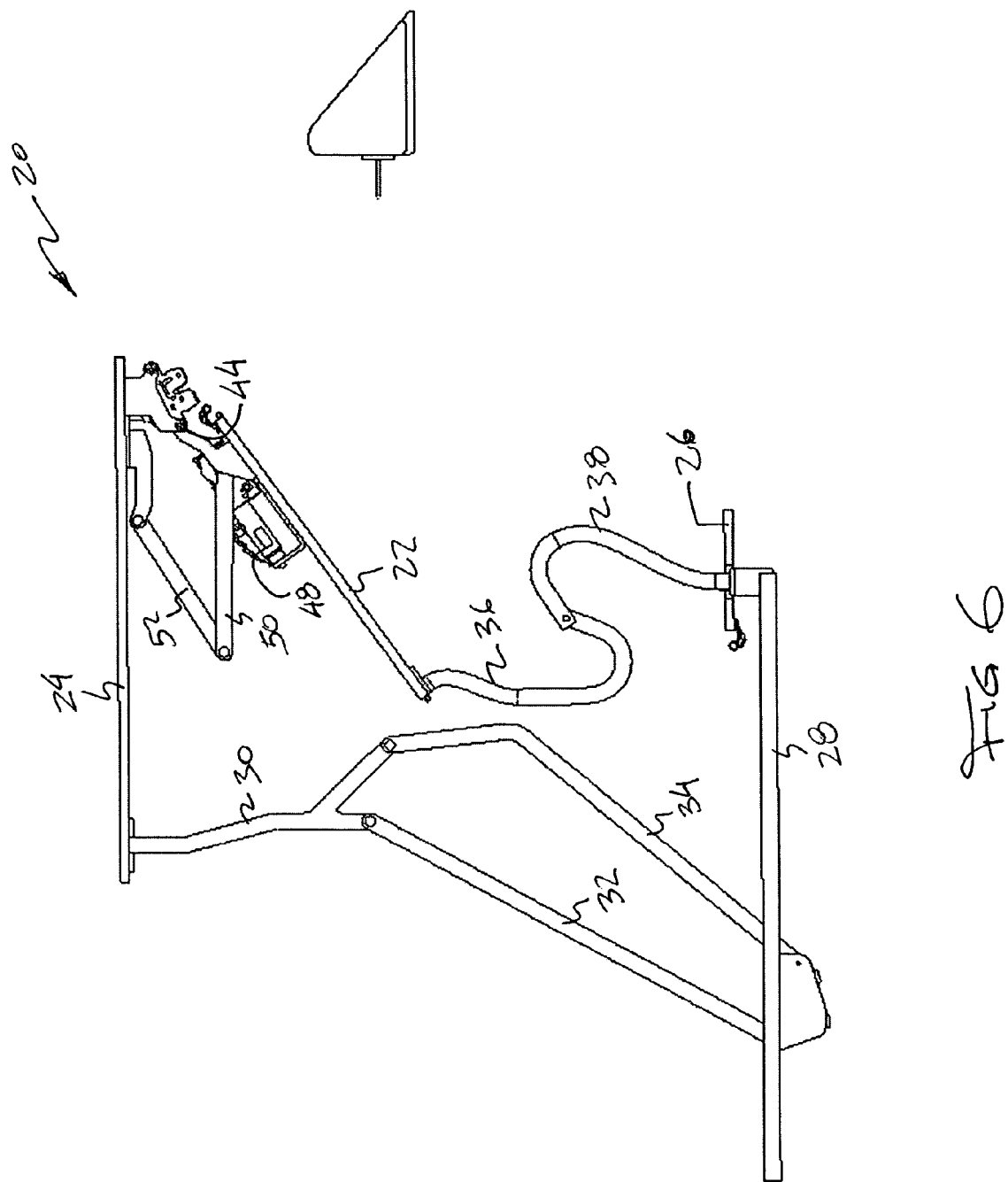
Figure 7:
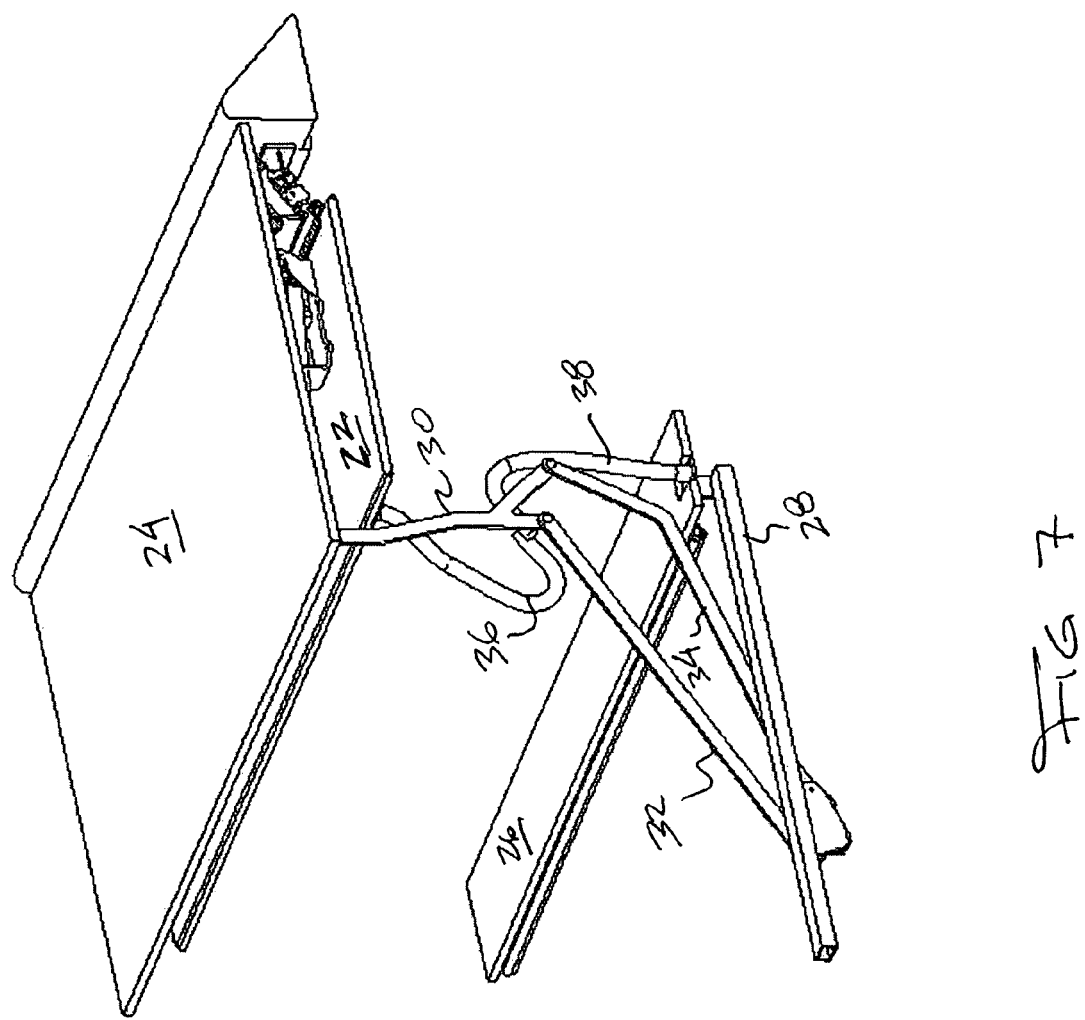
FIG. 7 is a perspective view of the tonneau cover system of FIG. 3 shown in the stored position.

FIGS. 3-7 illustrate a first embodiment of the tonneau cover system 2, which has an articulation mechanism in the form of a linkage mechanism. FIG. 3 shows the system 20 in the extended position, while FIG. 7 shows the system 20 in the storage position. FIGS. 4-6 disclose various positions of the system 20 in between the extended and storage positions. The system 20 includes a support frame 28. The support frame 28 supports the linkage required for the articulation of the panels 22 and 24. The support frame 28 consists of a pair of rails attached to the vehicle storage area 12, one at each side. Alternatively, the linkage may be supported by attachment points integral to the pickup, such that a separate support frame is not required, or a smaller support frame is used. A trim panel 26 is secured to the vehicle adjacent a front edge of the front panel 22. The trim panel 26, however, remains stationary in the horizontal position as shown.

More specifically, an arm 30 extends downwardly from a rear end of the rear panel 24. Optionally, an arm 30 is provided at each rear corner of the rear panel 24. A first balance link 32 has one end pivotally coupled with a distal lower end of the arm 30 and an opposite end pivotally coupled with the frame 28. A second balance link 34 similarly has one end pivotally connected to the lower end of the arm 30 and the other end pivotally coupled with the frame 28. The ends of the balance links 32 and 34 are connected to the arm 30 at different positions on the arm 30, so as to provide a four-bar mechanism operable to articulate the system 20 between the extended and storage positions. A hook-shaped front arm 36 extends upwardly from front corners of the front panel 22. A similarly hook-shaped front support arm 38 extends upwardly from the forward end of the support frame 28 with the front arm 36 and support arm 38 pivotally coupled at their upper hooked ends by a pivot pin 40. As a further alternative, the front arm 36 may be pivotally coupled with a point on the vehicle structure, such as on the flying buttresses shown on FIG. 1. The balance links 32 and 34 are preferably about the same length and at similar angles relative to horizontal. This allows the 4-bar mechanism to move through 180 degrees and to go over center. As will be clear to those of skill in the art, the various arms may have shapes other than shown, and the pivot points may be altered as needed for a particular application.

Referring to FIGS. 4-6, the front panel 22 is pivotally coupled at its rearward edge to the forward end of the rear panel 24 at a pivot 44. The pivot 44 is partially shown in the figures behind a latch 46. The latch 46 retains the covers 22, 24 in the extended position by lockingly engaging a latch receiver on the support frame 28.

The balance links 32, 34 define a four-bar linkage with the rear panel 24 and frame 28. The front panel 22 and front arm 36 define a third parallel link. Further, the front panel pivots 40, 44 define a line of force that is generally parallel to and about the same length as the lines of force defined by the balance links 32, 34. By this arrangement, the system 20 is over-constrained and operates only when the "links" (32, 34, and 22+36) form a parallelogram. In other words, when two of the three parallel links or lines of force are inline or over-centered, the third link (22+36) has the moment arm to pull this system 20 out of the constrained condition. This allows the linkage to pass over center without locking up.

In FIG. 4, the tonneau cover system 20 is shown partially articulated from the extended position. An actuator link 52 is pivotally coupled to the rear panel 24 and extends downwardly therefrom. One end of an actuator arm 50 is pivotally coupled to the actuator link 52, while an opposite end of the actuator arm 50 is connected to an actuator 48. Specifically, the actuator arm 50 is fixedly secured to a rotating output shaft of the actuator 48. To move the system toward the storage position, the actuator 48 rotates the actuator arm 50 counter-clockwise as viewed in the figures, relative to the front panel 22. The counter-clockwise movement of the actuator arm 50 causes the actuator link 52 to pull downwardly on the rear panel 24. Due to the aforementioned linkage configuration, the downward pull on the rear panel 24 causes a clockwise rotation of the front panel 22. Further, the rear panel 24 is lifted upwardly and remains generally horizontal, as the balance links 32, 34 pivot about their respective lower pivot points on the frame 28. In FIGS. 5 and 6, the tonneau cover system 20 is shown further articulated toward the storage position. From the position shown in FIGS. 1 and 4, the front panel 22 has rotated clockwise, while the rear panel 24 has continued to rise relative to the frame 28 and remained generally horizontal. Finally, in FIG. 7, the tonneau cover system 20 has reached the storage position with the rear panel 24 stacked in a substantially horizontal orientation above the front panel 22. The latch 46 lockingly engages a latch receiver 56 on the roof of the truck 10 to retain the system 20 in the storage position. The system 20 is returned to the extended position by first unlocking the latch 46 from the receiver 56 and reversing the sequence as described above. An air dam or deflector (not shown) may be provided on the roof to direct airflow over the system 20 while the truck 10 is moving, thereby minimizing aerodynamic drag caused by the system 20.

In FIGS. 1-7, the linkage mechanism has been shown only on the passenger's side of the truck 10. It should, however, be readily apparent that the system 20 can include a symmetrically opposite linkage on the driver's side of the truck. Preferably, the system 20 does include symmetrically opposite dual linkages, though only a single actuator 48 may be necessary to articulate the system 20 between the extended and storage positions. As will be clear to those of skill in the art, the actuator 48 may take other forms, and may cause articulation of the panels 22 and 24 in a manner other than illustrated.

Figure 8:
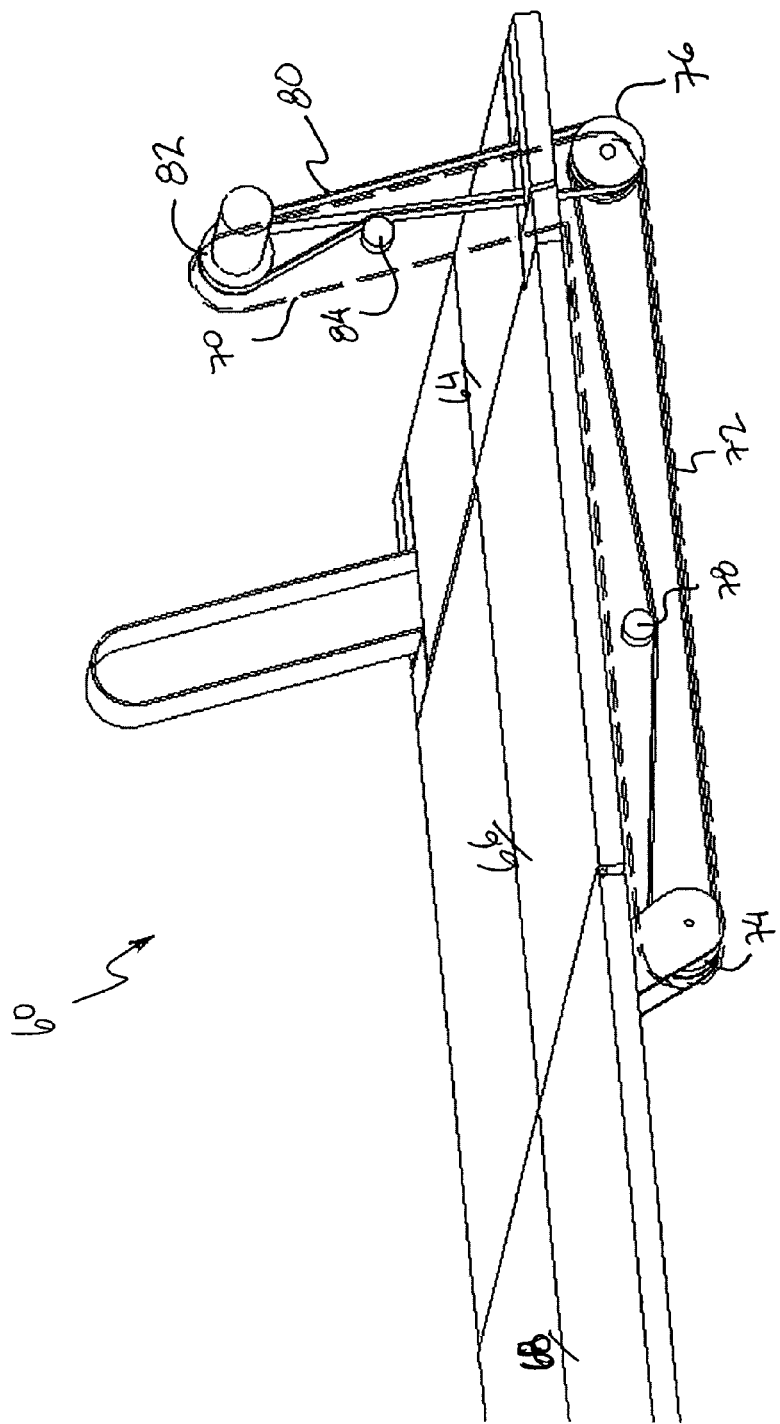
FIG. 8 is a perspective view of a second embodiment of the tonneau cover system shown in the extended position.
Figure 9:
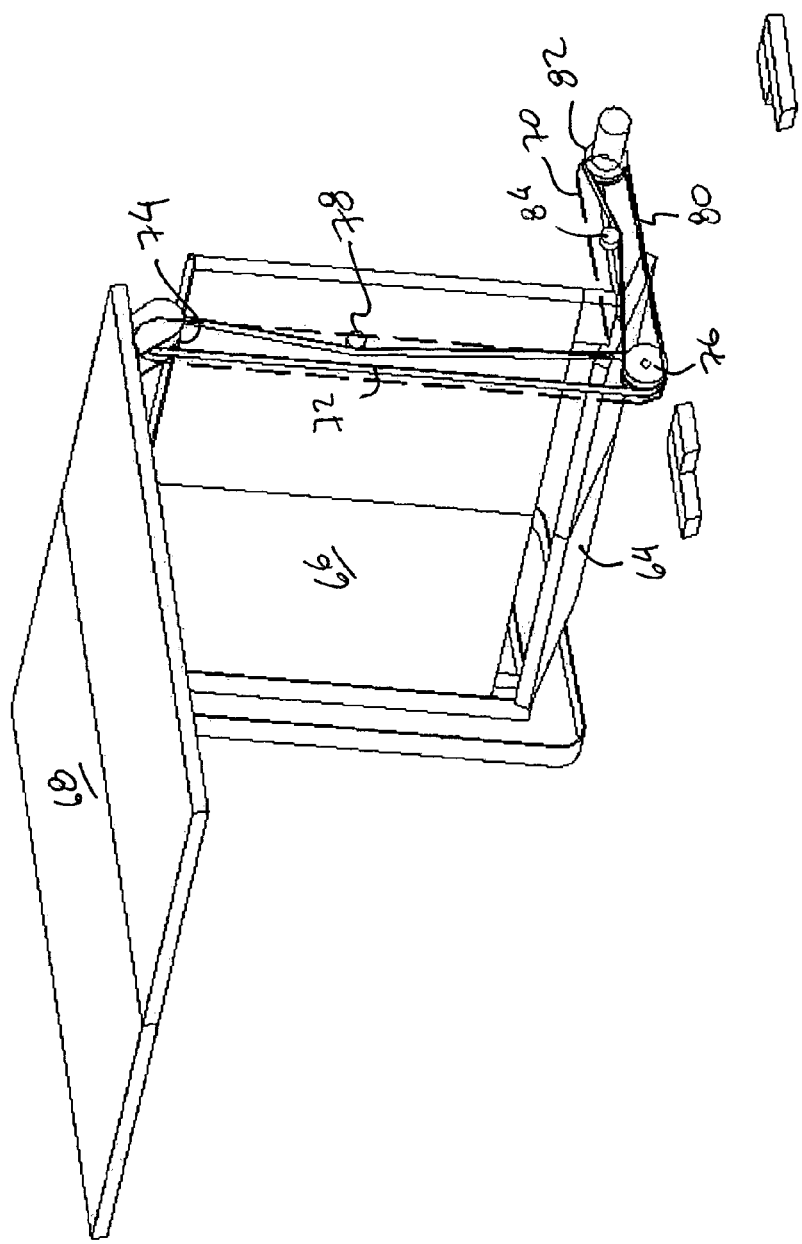
FIG. 9 is a perspective view of the tonneau cover system of FIG. 8 shown in an intermediate position.
Figure 10:
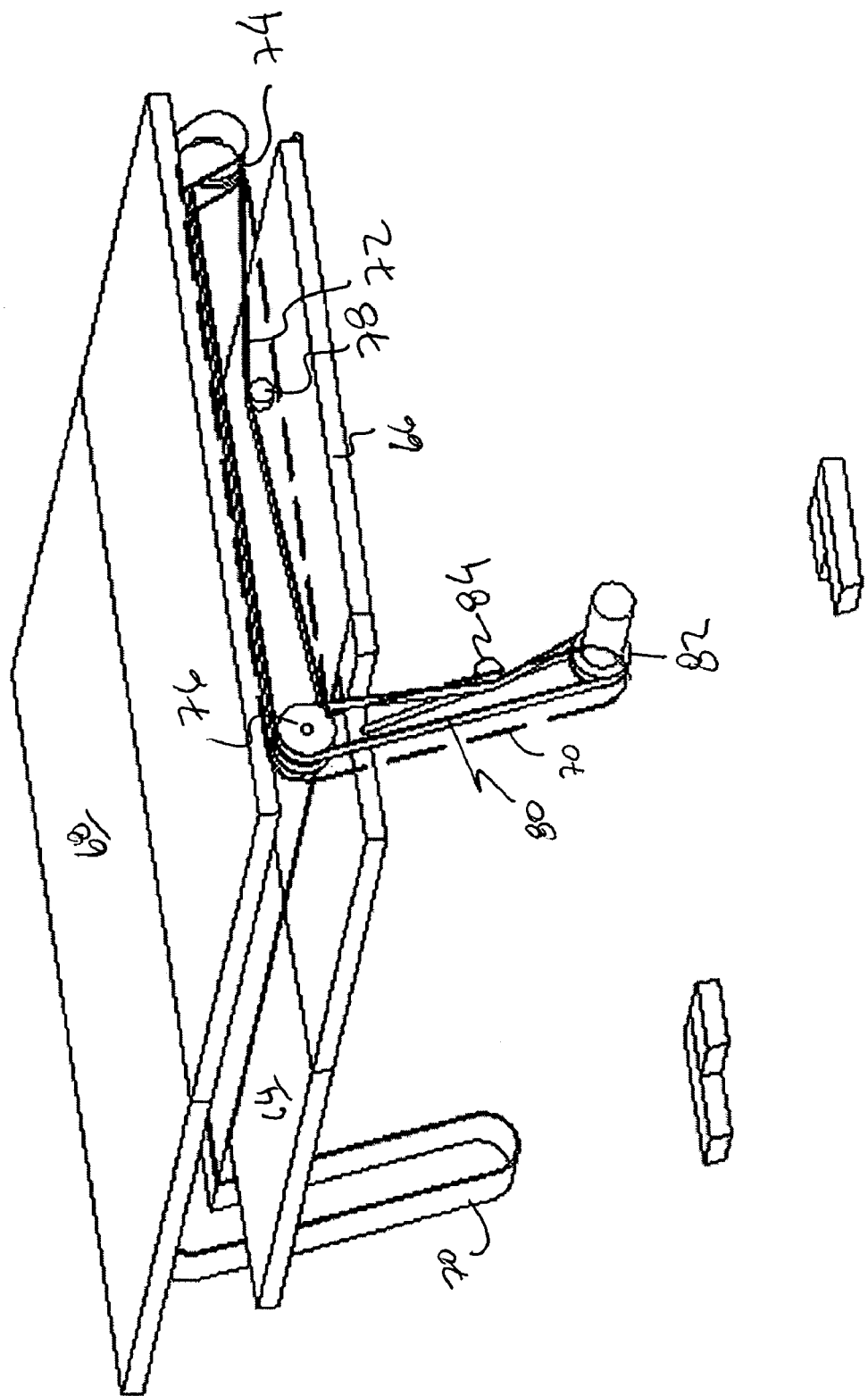
FIG. 10 is a perspective view of the tonneau cover system of FIG. 8 shown in the stored position.
Figure 11:
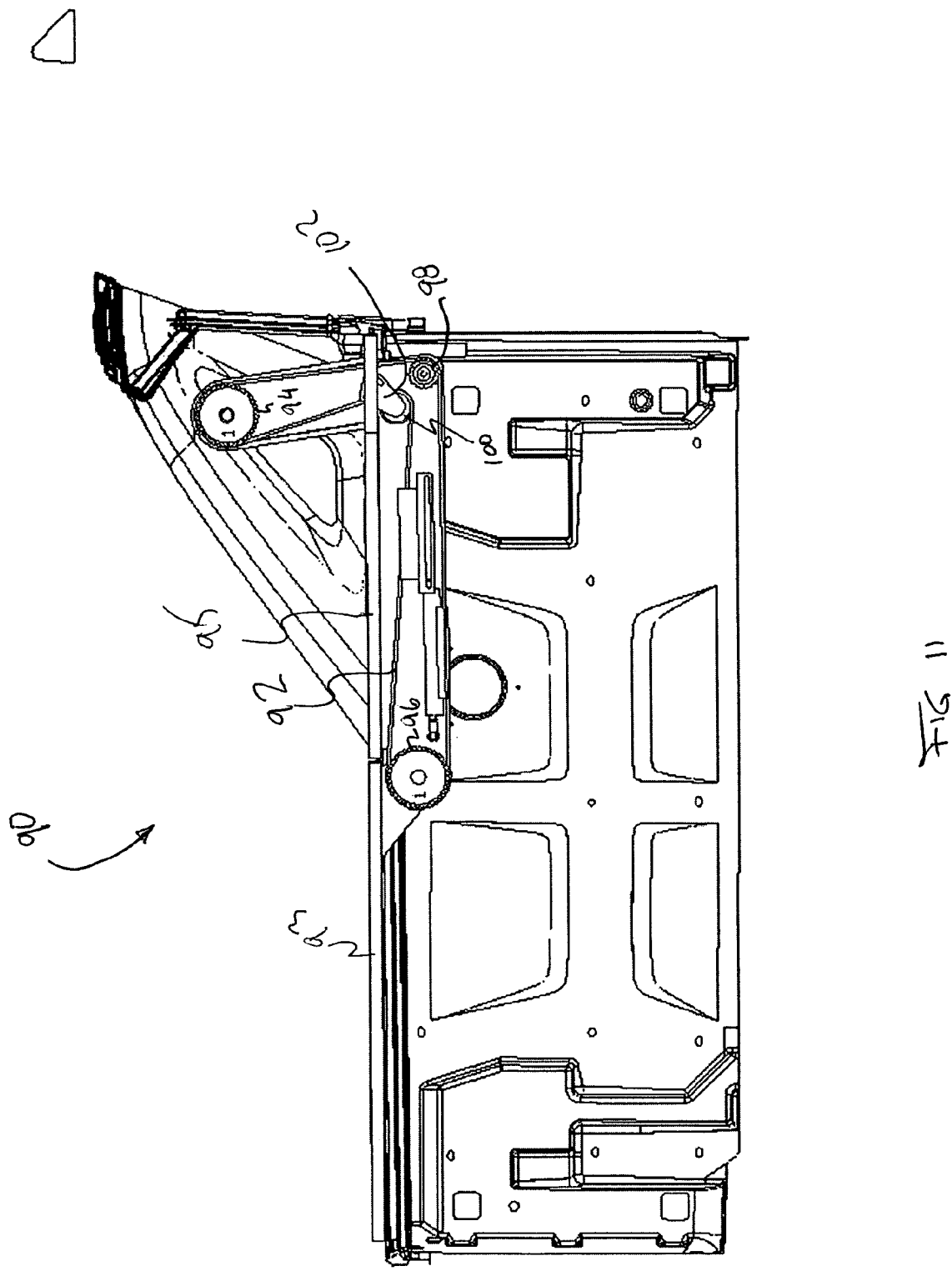
FIG. 11 is a side elevational view of a third embodiment of the tonneau cover system shown in the extended position.
Figure 12:
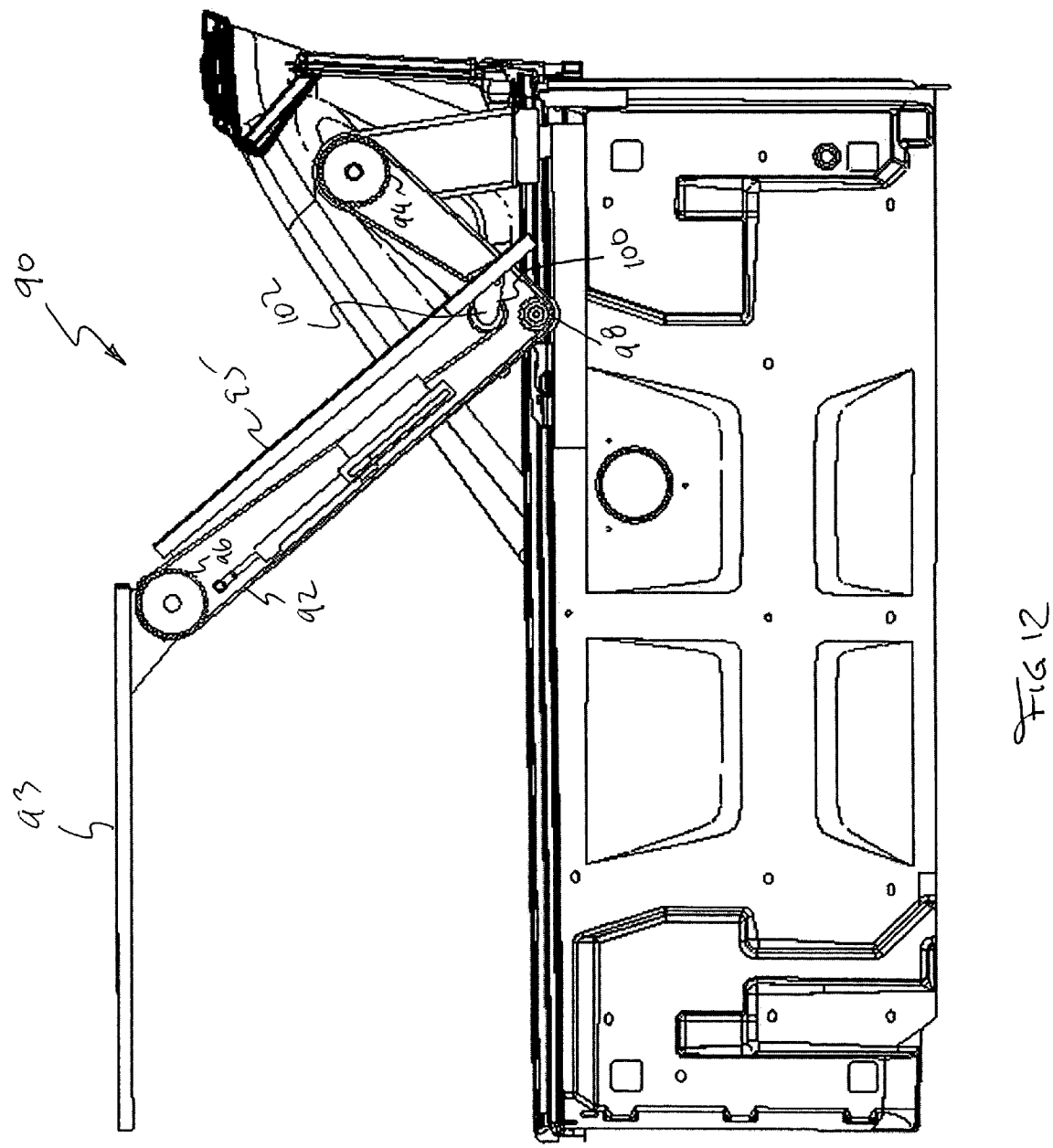
FIG. 12 is a side elevational view the tonneau cover system of FIG. 11 shown in an intermediate position.

Referring to FIGS. 8-10, a second embodiment of the tonneau cover system is generally indicated at 60. The system 60 of this embodiment utilizes a different articulation mechanism, in which a belt and pulley arrangement is used instead of links for moving the panels between the extended and storage positions. The system 60 includes a front panel 64, a middle panel 66, and a rear panel 68. Similar to the previous embodiment, the articulation mechanism allows movement of the panels 64, 66, 68 between the extended position, as shown in FIG. 8, and the storage position, as shown in FIG. 10. In FIG. 9, the system 60 is shown in an intermediate position between the extended and storage positions.

The system 60 includes a support frame or belt box 70 that houses a first belt 72. The belt 72 wraps about a rear pulley 74 and a front pulley 76. The rear pulley 74 is anchored to the rear panel 68 so that rotation of the pulley 74 causes rotation of the panel. The rear pulley 74 also serves as the panel-to-panel pivot between the rear panel 68 and the middle panel 66. The belt box 70 is attached to the middle panel 66. A tensioner 78 is provided so as to tension the belt 72. The front pulley 76 is rotatably supported at the front end of the belt box 70. A second belt 80 wraps about the front pulley 76 at its lower end and extends upwardly and wraps about an upper pulley 82 which is anchored to the vehicle body or similar stationary support. A second tensioner 84 tensions the second belt 80. By this arrangement, movement of the belt 80 or belt 72 relative to the belt box 70 causes the system 60 to articulate between the extended and storage positions. It should be appreciated by those skilled in the art that the pulley and belt components described above are readily interchangeable with equivalent sprocket and chain components.

Figure 13:
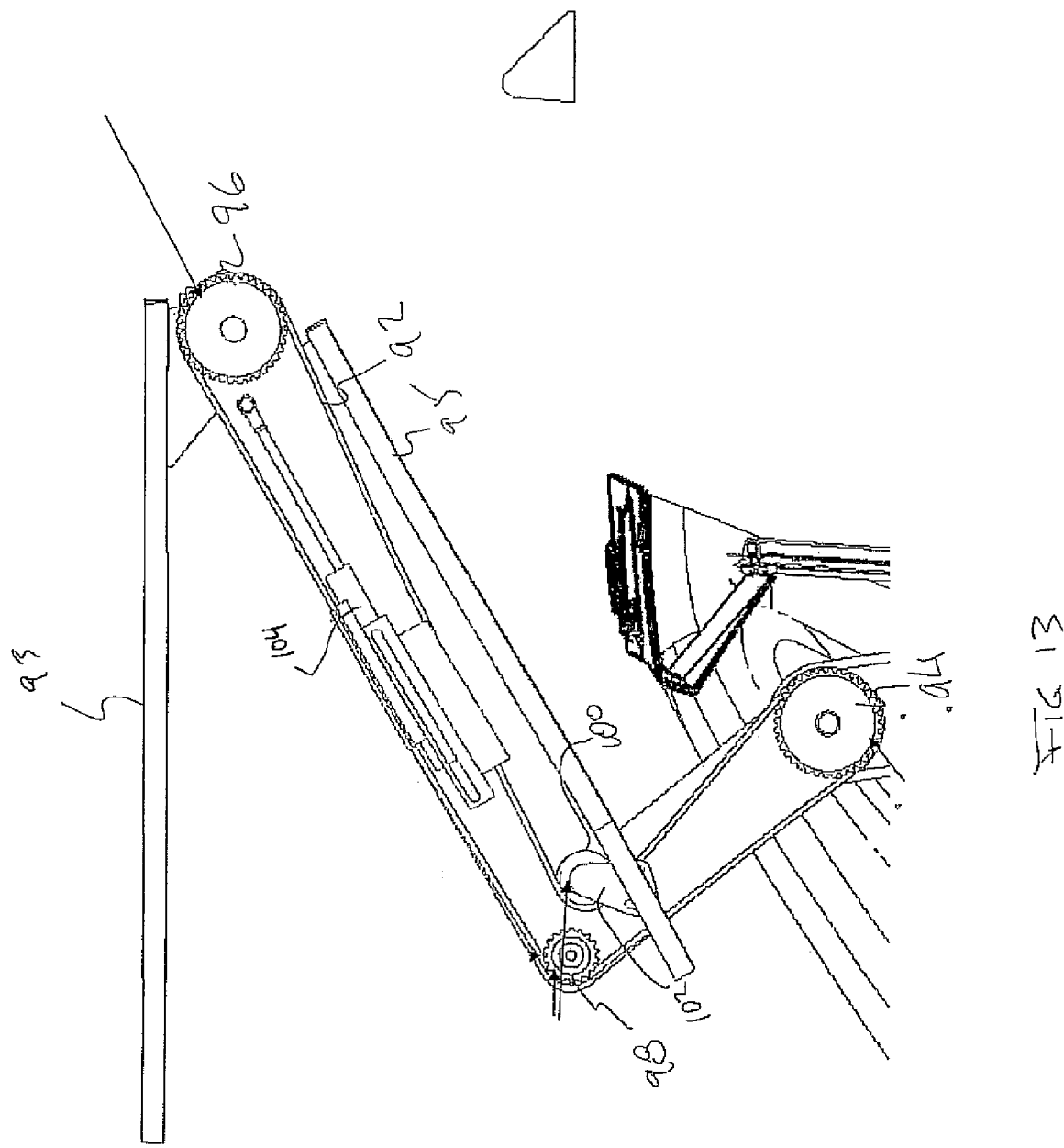
FIG. 13 is a side elevational view of the tonneau cover system of FIG. 11.
Figure 14:
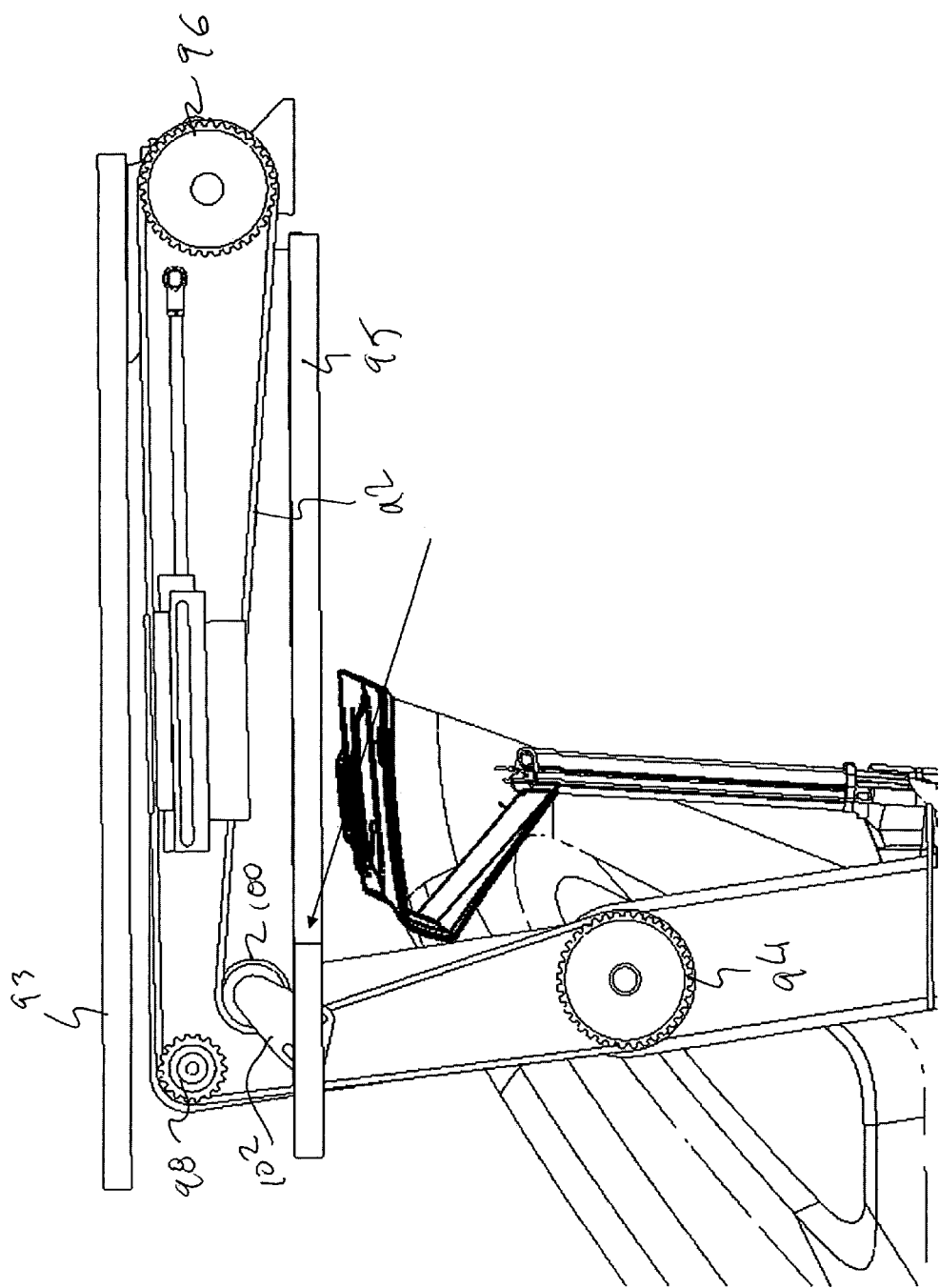
FIG. 14 is a side elevational view of the tonneau cover system of FIG. 11 shown in the stored position.
Figure 15:
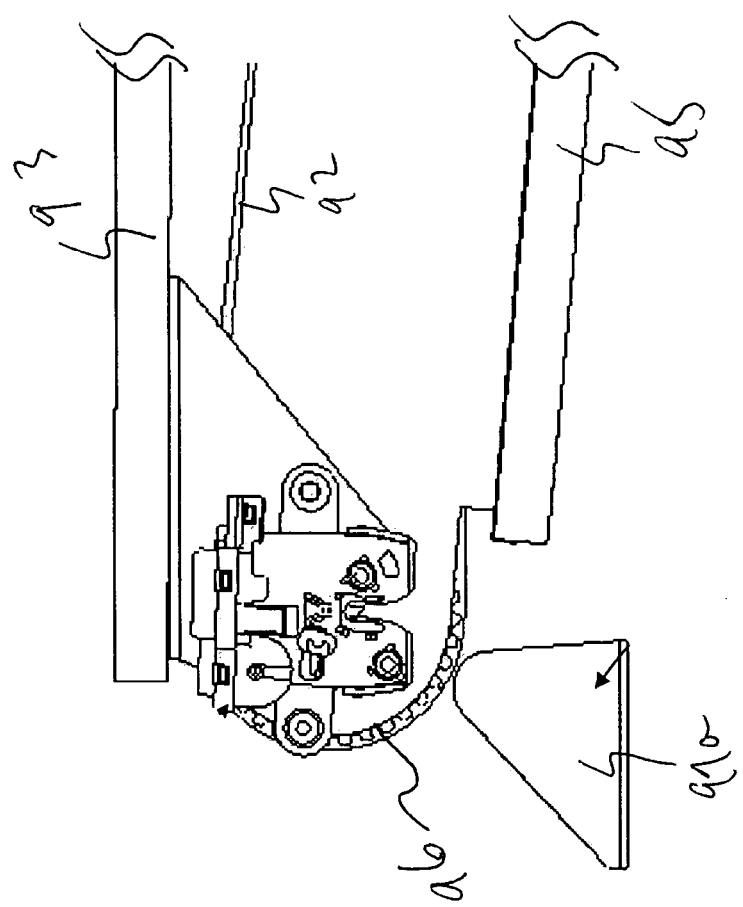
FIG. 15 is an enlarged side elevational view of a portion of the vehicle roof and tonneau cover system of FIG. 11 just prior to engaging a roof-mounted latch receiver in the stored position.
Figure 16:
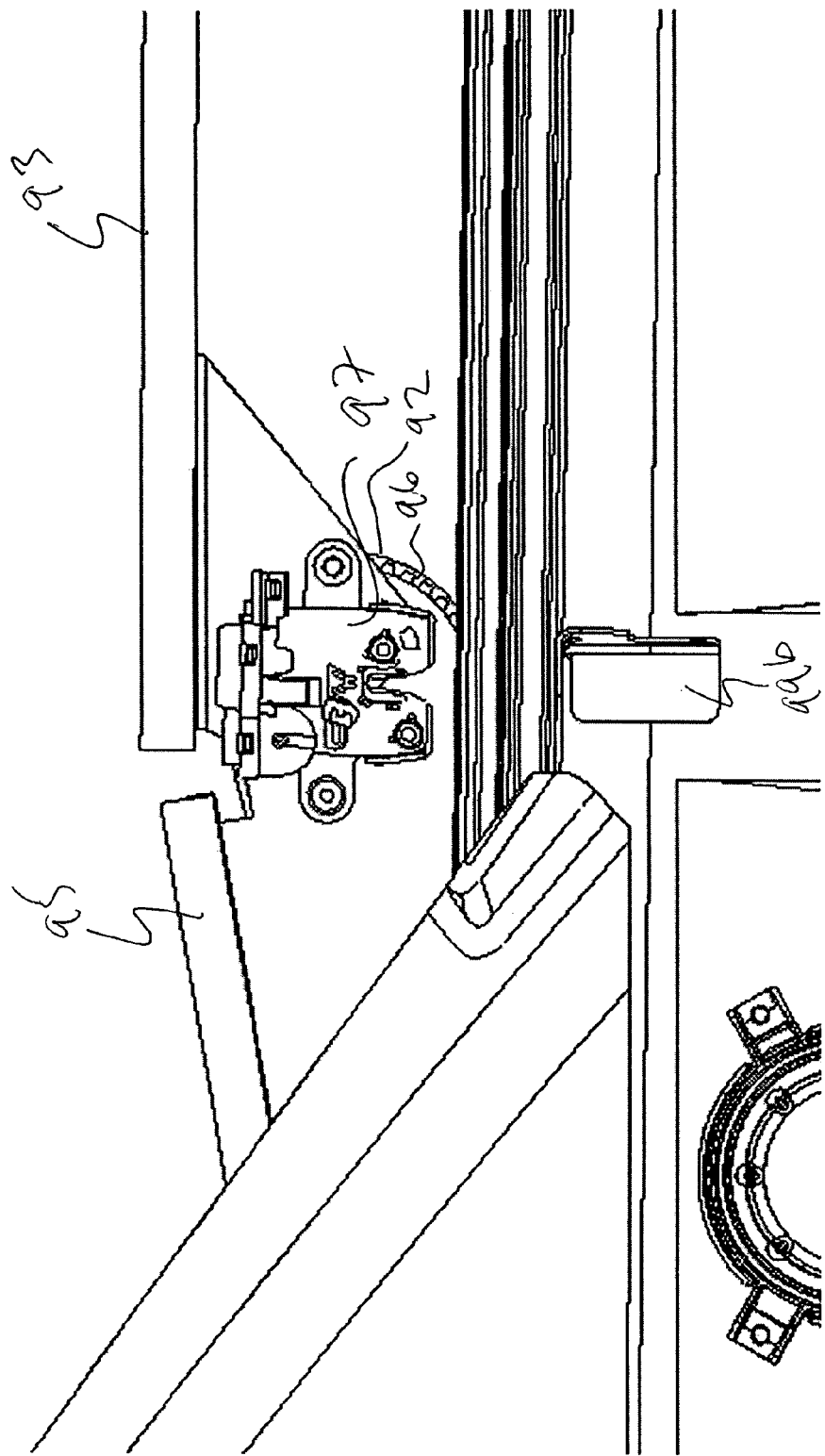
FIG. 16 is an enlarged side elevational view of a portion of the vehicle and tonneau cover system of FIG. 11 just prior to engaging a body-mounted latch receiver in the extended position.

Referring to FIGS. 11-16, a third embodiment of the tonneau cover system is indicated at 90, wherein a single belt or chain 92 is used for driving the panels 93, 95 between the extended and storage positions. The pulleys as described in the previous embodiment are replaced by upper 94 and rear 96 sprockets with teeth for engaging the links of the chain 92. A middle sprocket 98 and a tensioner sprocket 100 are drivingly engaged to opposite sides of the chain 92 between the upper 94 and rear 96 sprockets. The tensioner sprocket 100 is pivotally coupled to a rocker 102 that is pivotally biased toward the chain 92 or in a generally counterclockwise direction as viewed in the figures. As shown in FIG. 13, an actuator 104 is provided as a drive system, and may be hydraulic. electric or pneumatic. As shown in FIG. 15, a latch mechanism 97 is coupled to the rear panel 93. The latch 97 lockingly engages a latch receiver 99a mounted to the roof of the vehicle to lock the panels 93, 95 in the storage position. As shown in Figure 16, the latch 97 also engages a second latch receiver 99b mounted on the vehicle body.

Figure 17:
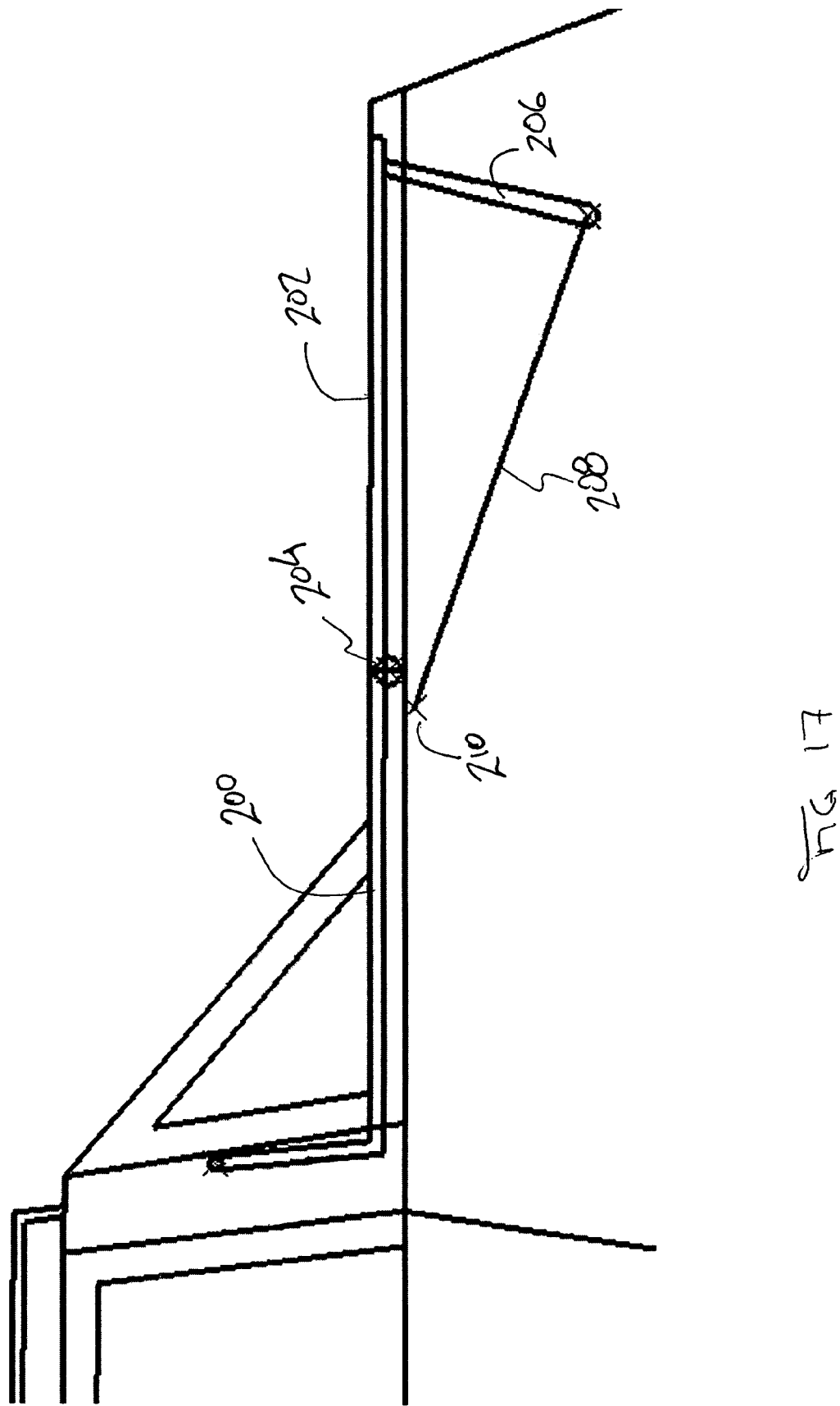
FIG. 17 is a side elevational view of a fourth embodiment of the tonneau cover system shown in the extended position.
Figure 16A:
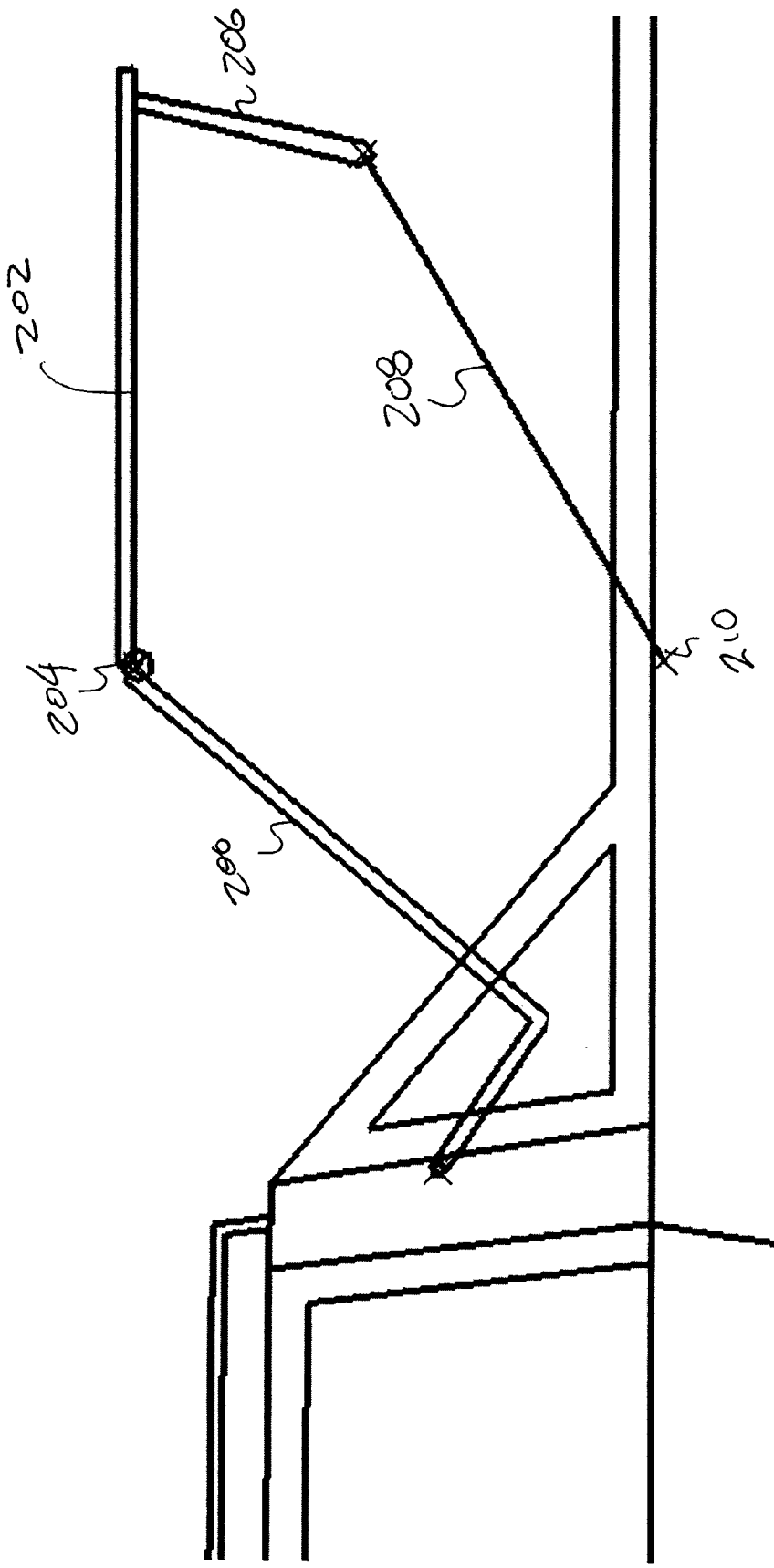
Figure 19:
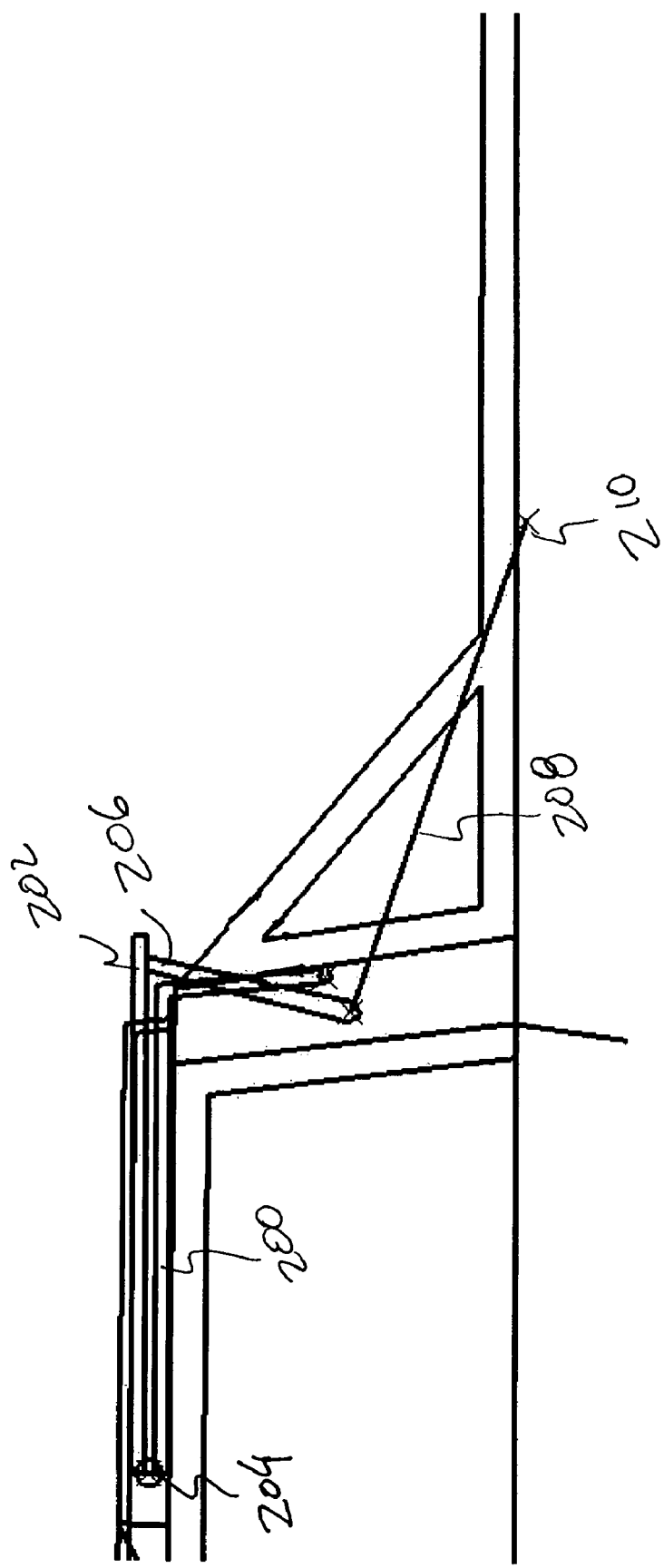
FIG. 19 is a side elevational view of the tonneau cover system of FIG. 17 shown in the stored position.

Referring to FIGS. 17-19, a fourth embodiment of the tonneau cover system is shown, which includes a front panel 200, a rear panel 202, and a spring-loaded pivot 204 interconnecting the front and back panels. The front panel 200 has an upwardly extending portion or arm 90, which is pivotally coupled with the vehicle body. The rear panel 202 has a downwardly extending portion or arm 206 near its rearward edge. A cable 208 interconnects the lower end of the arm 206 with an anchor point 210 near the pivot 204 when the cover is in the extended position. The spring-loaded pivot 204 biases the front panel 200 and rear panel 202 into the co-planar extended position illustrated in FIG. 17. The cable 208 causes the rear panel 202 to remain in the generally horizontal position during articulation of the panels 200,202 between the extended position, the stored position shown in FIG. 19 and the intermediate positions therebetween, as illustrated by FIG. 18. The spring-loaded pivot 204 keeps the cable 96 in tension. The cable 208 has a similar function as a link, except that it will not resist compressional forces. Therefore, the spring 204 allows the cable to remain in tension.

Referring to FIG. 20, a fifth embodiment of the invention is shown, which uses drive shafts instead of belts or chains in the previous embodiments. This embodiment includes a front panel 300 and a rear panel 302 that are pivotally coupled to each other. An L-shaped drive housing 304 is coupled with the front panel 300. A first or top gear 306 is fixed relative to the body while a second or rear gear 308 is fixed relative to the rear panel. A third or center gear 310 translates rotation of the vertical drive shaft 312 to the horizontal drive shaft 314. Arrows in FIG. 20 illustrate the relative rotations of the various parts. An actuator may drive various portions of the system, such as rotating gear 310 in a clockwise direction in this view, which rotates the vertical drive shaft 312 so as to cause the pinion to climb the front gear 306, causing rotation of the housing 304 and lifting of the panel 100. At the same time, the rotation of the gear 310 causes rotation of the horizontal drive shaft causing the rear panel to rotate downwardly relative to the front panel. Preferably, the rear panel remains generally horizontal as panels 300 and 302 move from the extended position covering the storage area to a storage position on the vehicle roof.

It should be readily appreciated by those skilled in the art that a variety of drive systems may be used for actuating the belt or chain driven embodiments described above. One approach is to provide a linear actuator between the belt housing and the belt or chain to engage and move the belt. Another alternative is to provide a rotary actuator for driving one of the pulleys.

It should also be appreciated by those skilled in the art that the articulation mechanisms described above for moving the tonneau cover system between the storage and extended positions can also be used for moving a convertible top between an extended position covering the passenger compartment and a retracted position stacked in a storage space behind the passenger compartment or on top of a rear decklid.

As will be clear to those of skill in the art, the embodiments of the present invention illustrated and discussed herein may be altered in various ways without departing from the scope or teaching of the present invention. For example, the relative dimensions of the various panels and linkages may be altered depending on the application. Also, different articulation approaches may be used. A remote control may be provided for operating the tonneau cover system. Additionally, a manually operated system may be provided. Other alterations will also be clear to those of skill in the art. As such, these disclosures should be interpreted broadly.

I claim:

1. A tonneau cover system for selectively covering a cargo area of a vehicle, wherein the vehicle includes a roof adjacent the cargo area, the system comprising:
   a front panel;
   a rear panel; and
   an articulation mechanism operable to move the panels between an extended position, in which the panels are generally co-planar to cover the storage area, and a storage position, in which the panels are stacked on the roof of the vehicle to allow access to the storage area, the articulation mechanism including a rear sprocket coupled to the rear panel so that rotation of the sprocket causes corresponding rotation of the rear panel.

2. The system as set forth in claim 1, wherein the panels are pivotally coupled to each other for movement between the extended and storage positions.

3. The system as set forth in claim 1, wherein the articulation mechanism includes an upper sprocket fixedly secured to the vehicle.

4. The system as set forth in claim 3, wherein the articulation mechanism includes a chain drivingly supported by the rear and upper sprockets.

5. The system as set forth in claim 4, wherein the articulation mechanism includes an actuator for driving the chain about the rear and upper sprockets, so as to cause selective movement of the panels between the extended and storage positions.

6. The system as set forth in claim 4, wherein the articulation mechanism includes a tensioning mechanism for reducing slack in the chain during movement of the panels between the extended and storage positions, the tensioning mechanism comprising a sprocket continuously biased toward engagement with the chain.

7. The system as set forth in claim 4, wherein the articulation mechanism includes a middle sprocket engaged with the chain between the rear and upper sprockets.

8. The system as set forth in claim 7, wherein the articulation mechanism includes a housing having an upper and a lower arm arranged substantially orthogonally relative to each other, the upper arm being pivotally coupled to the vehicle for movement about an axis that is generally coaxial with the upper sprocket, the front panel being supported by the lower arm.

9. A tonneau cover system for selectively covering a cargo area of a vehicle, wherein the vehicle includes a roof adjacent the cargo area, the system comprising:
   a first panel having an extended position wherein the first panel covers at least a portion of the cargo area and a storage position wherein the first panel is disposed on the roof of the vehicle, the first panel having an outer surface that faces upwardly in the extended position and faces downwardly in the storage position;
   a second panel coupled with the first panel, the second panel having an extended position wherein the second panel covers at least a portion of the cargo area and a storage position wherein the second panel is disposed on the roof of the vehicle, the second panel remaining generally horizontal as it moves between the extended position and the storage position; and
   an articulation mechanism operable to move the panels between the extended position and the storage position.

10. The system according to claim 9, wherein the panels are substantially coplanar in the extended position to substantially cover the cargo area.

11. The system according to claim 9, wherein each of the panels have inner surfaces that face the cargo area in the extended position and face each other in the storage position.

12. The system according to claim 9, wherein the panels are substantially parallel in both the extended and storage positions.

13. A tonneau cover system for selectively covering a cargo area of a vehicle, the vehicle having a roof adjacent the cargo area, the system comprising:
   at least one panel having an extended position wherein the panel covers at least a portion of the cargo area and a storage position wherein the panel is disposed on the roof of the vehicle; and
   an articulation mechanism operable to move the panel between the extended position and the storage position, the mechanism configured such that the panel remains in a generally horizontal position throughout the movement between the extended position and the storage position.

14. The system according to claim 13 including a second panel movably connected to the at least one panel.

15. The system according to claim 13, wherein the at least one panel comprises two panels.

16. The system according to claim 15, wherein the panels are substantially parallel in both the extended and storage positions.

17. The system according to claim 13, wherein the articulation mechanism includes a drive system, the drive system being selected from the group consisting of hydraulic, electric and pneumatic.

18. The system according to claim 13, wherein the articulation mechanism includes a drive system, the system being a rotary drive system.

19. The system according to claim 13, wherein the articulation mechanism includes a drive system, the system being a linear drive system.

20. A cover system for covering an opening in a vehicle, the system comprising:
   at least one cover member for selectively covering at least a portion of the opening; and
   a serpentine drive system operable to move the at least one cover member between an open position and an extended position;
   wherein the at least one cover member is generally horizontal in both the open and extended positions.

21. The system according to claim 20, wherein the serpentine drive system includes an endless serpentine member selected from the group consisting of a chain and a belt.

22. The system according to claim 21, wherein the serpentine drive system includes a linear actuator operatively coupled to the serpentine member for driving the at least one cover member between the open and extended positions.

23. The system according to claim 21 including a sprocket coupled to the at least one cover member, the sprocket being drivingly engaged with the serpentine member to move the cover member between the open and extended positions.

24. A cover system for covering an opening in a vehicle, the system comprising:
   at least one cover member for selectively covering at least a portion of the opening; and
   a serpentine drive system operable to move the at least one cover member between an open position and an extended position;

wherein the cover member includes an outer surface facing upwardly in both the open and extended positions.

25. A tonneau cover system for selectively covering a cargo area of a vehicle, wherein the vehicle includes a roof adjacent the cargo area, the system comprising:

a front panel;

a rear panel pivotally interconnected with the front panel;

the front and rear panels being movable between an extended position wherein the panels are generally coplanar to cover the storage area and a storage position wherein the panels are stacked on the roof of the vehicle to allow access to the storage area; and an articulation mechanism defining the movement of the panels between the extended position and the storage position such that the front and rear panels each follow a predefined path, the articulation mechanism further including an actuator powering the movement of the panels between the extended and storage positions.

26. A tonneau cover system for selectively covering a cargo area of a vehicle, wherein the vehicle includes a roof adjacent the cargo area, the system comprising:

a first panel having an extended position wherein the first panel covers at least a portion of the cargo area and a storage position wherein the first panel is disposed on the roof of the vehicle, the first panel having an outer surface that faces upwardly in the extended position and faces downwardly in the storage position;

a second panel coupled wit the first panel, the second panel having an extended position wherein the second panel covers at least a portion of the cargo area and a storage position wherein the second panel is disposed on the roof of the vehicle, the second panel having an outer surface that faces upwardly in the extended position; and an articulation mechanism operable to move the panels between the extended position and the storage position;

wherein the outer surface of the second panel faces generally upwardly throughout the movement between the extended and the storage position.

27. The system according to claim 26, wherein the articulation mechanism definies the movement of the panels between the extended position and the storage position such that the panels each follow a predefined path.

* * * * *

UNITED STATES PATENT AND TRADEMARK OFFICE
CERTIFICATE OF CORRECTION

PATENT NO. : 7,429,070 B2 Page 1 of 1
APPLICATION NO. : 11/216256
DATED : September 30, 2008
INVENTOR(S) : Frank Neubrand It is certified that error appears in the above-identified patent and that said Letters Patent is hereby corrected as shown below:

Column 4, line 13, replace "comers" with --corners--

Signed and Sealed this

Twenty-fourth Day of February, 2009

JOHN DOLL
*Acting Director of the United States Patent and Trademark Office*